INVENTOR.
Thomas R. Nisbet
BY
Attorneys

INVENTOR.
Thomas R. Nisbet
Attorneys

United States Patent Office 3,399,469
Patented Sept. 3, 1968

3,399,469
ANSWER ENTRY AND RECORDING SYSTEM
Thomas R. Nisbet, Palo Alto, Calif., assignor, by mesne assignments, to Edex Corporation, Mountain View, Calif., a corporation of Delaware
Filed Apr. 12, 1965, Ser. No. 447,167
8 Claims. (Cl. 35—48)

This invention relates to classroom apparatus and more particularly to apparatus for receiving and recording responses to questions propounded to students.

It is a general object of the invention to provide an improved system of recording students' answers.

It is another object of the present invention to provide a student answer recording system whereby the responses of each student in a class can be recorded, and more particularly recorded in spacial association with the correct answer to each question.

By providing such a system it is readily evident that a student can examine his performance as to each question and compare his own performance on each question with the correct answer which he should have recorded.

It is a further object of the present invention to provide a student answer recording system at minimum expense.

These and other objects of the invention will be more clearly apparent from the following detailed description of a preferred embodiment when considered in conjunction with the accompanying drawings in which.

Figure 1:
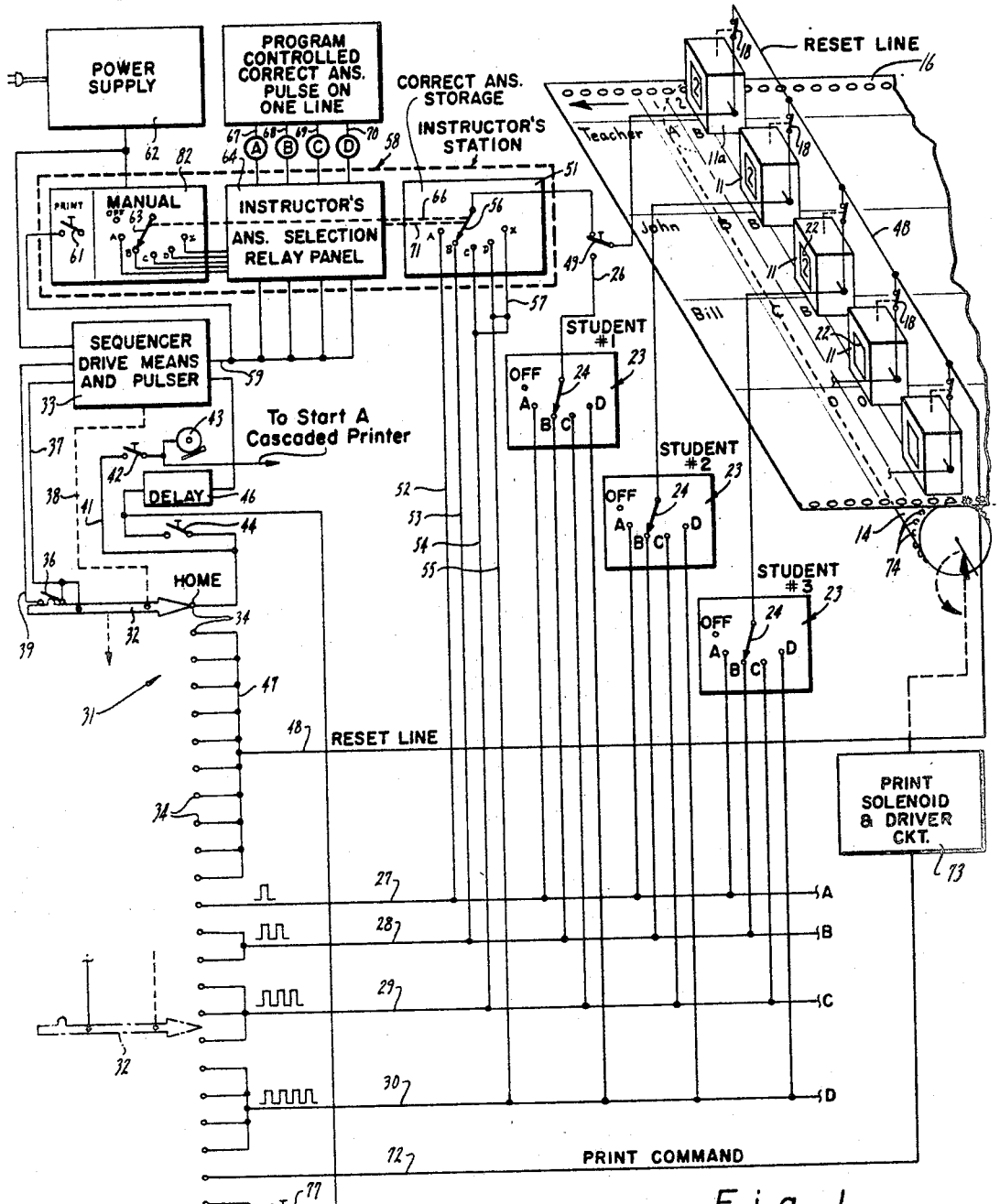
FIGURE 1 is a schematic system diagram showing the overall organization of the system.

FIGURES 3A through 3D form a schematic circuit diagram according to the system shown in FIGURE 1.

The general system organization is best shown in FIGURE 1 and includes a plurality of printing units 11. Each printing unit includes a printing element for presenting a predetermined ordered sequence of characters to be printed together with means for stepping the printing element through the sequence in response to receipt of a related ordered sequence of pulses so as to dispose the printing element in condition for printing one of the characters.

Figure 2:
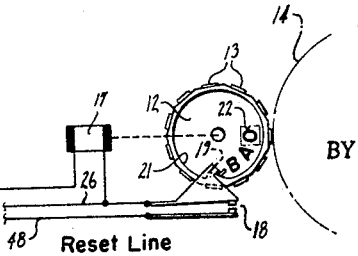
FIGURE 2 is a schematic diagram of a printing unit employed in the system of FIGURE 1.
Figure 3A:
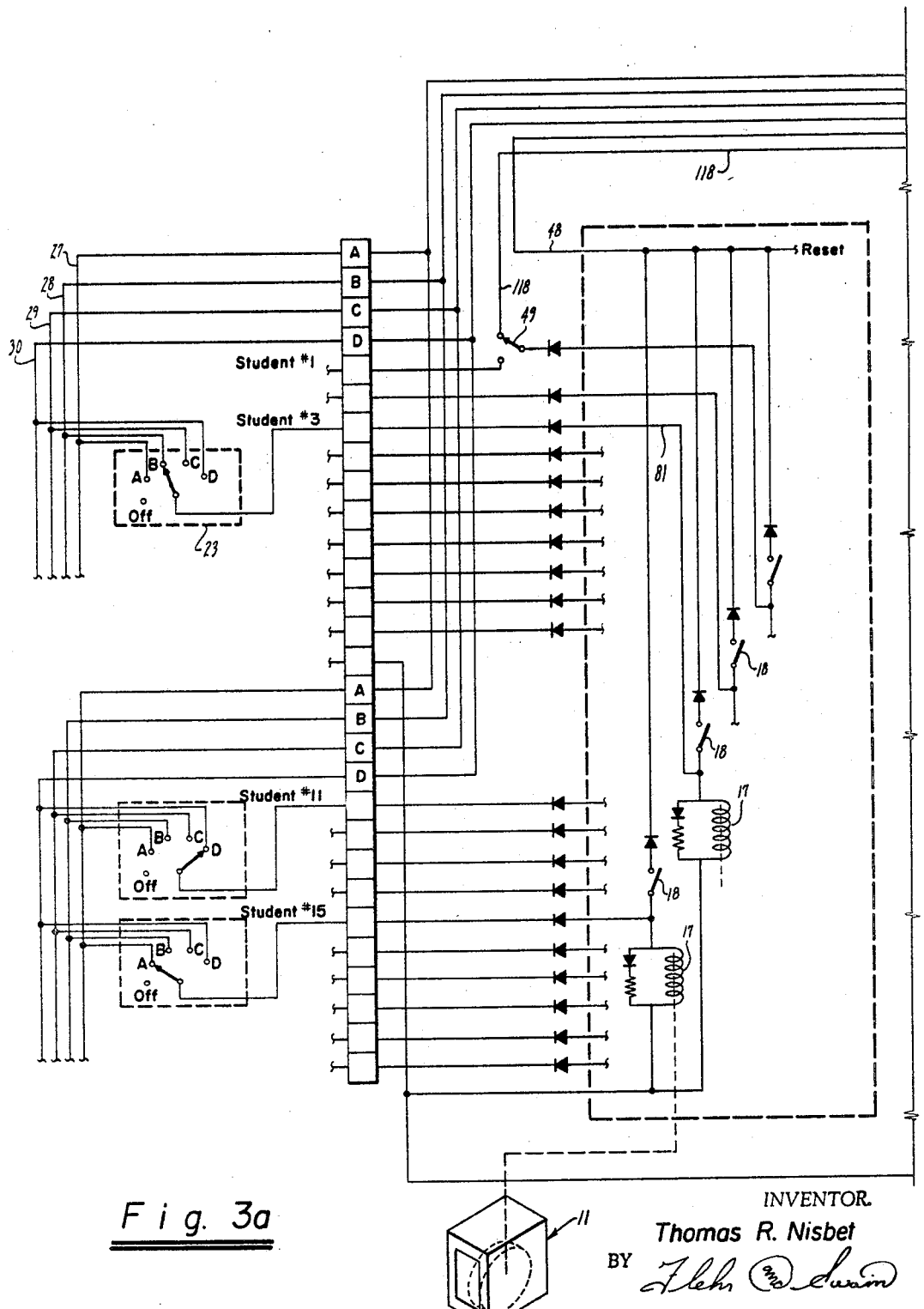
Figure 3B:
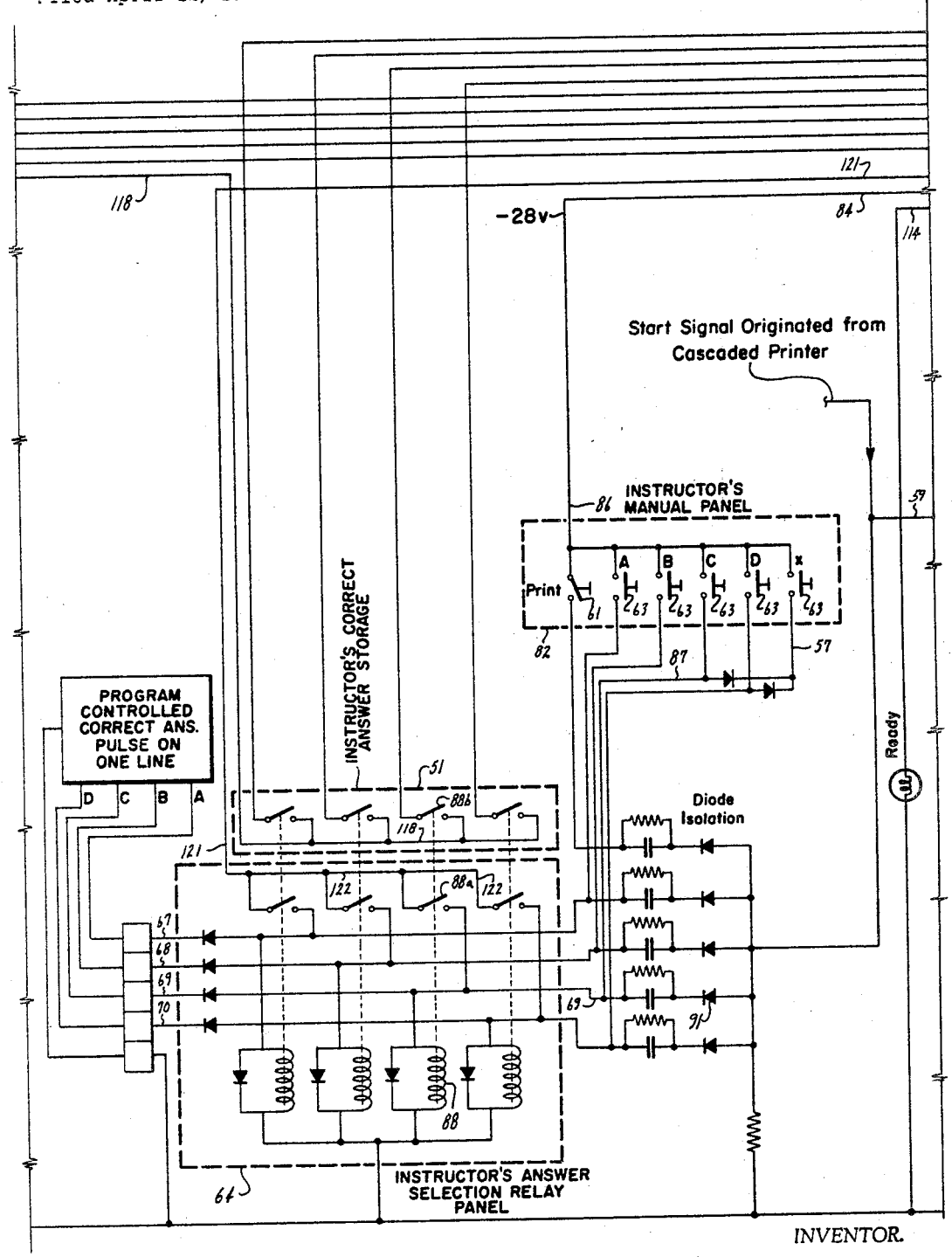
Figure 3C:
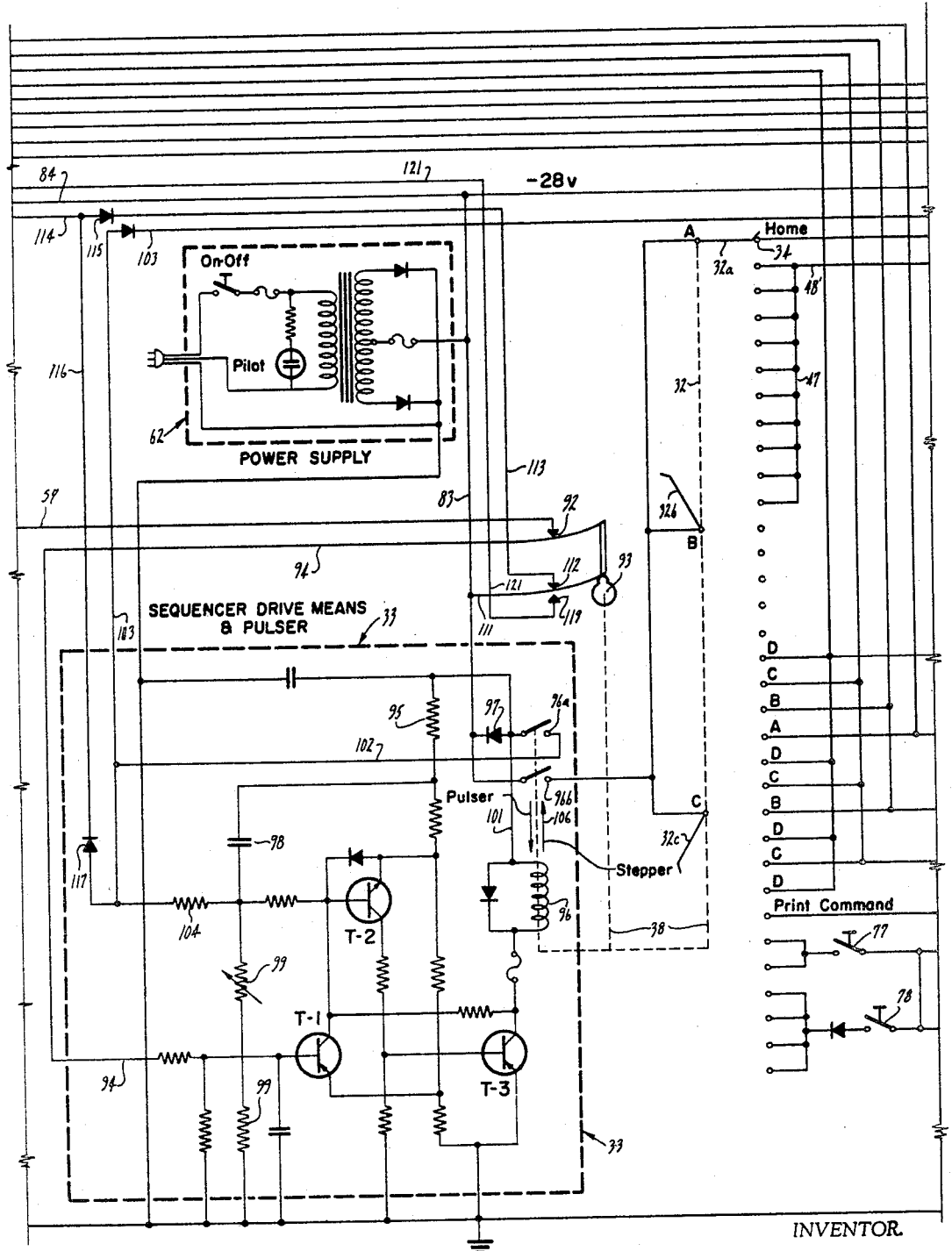
Figure 3D:
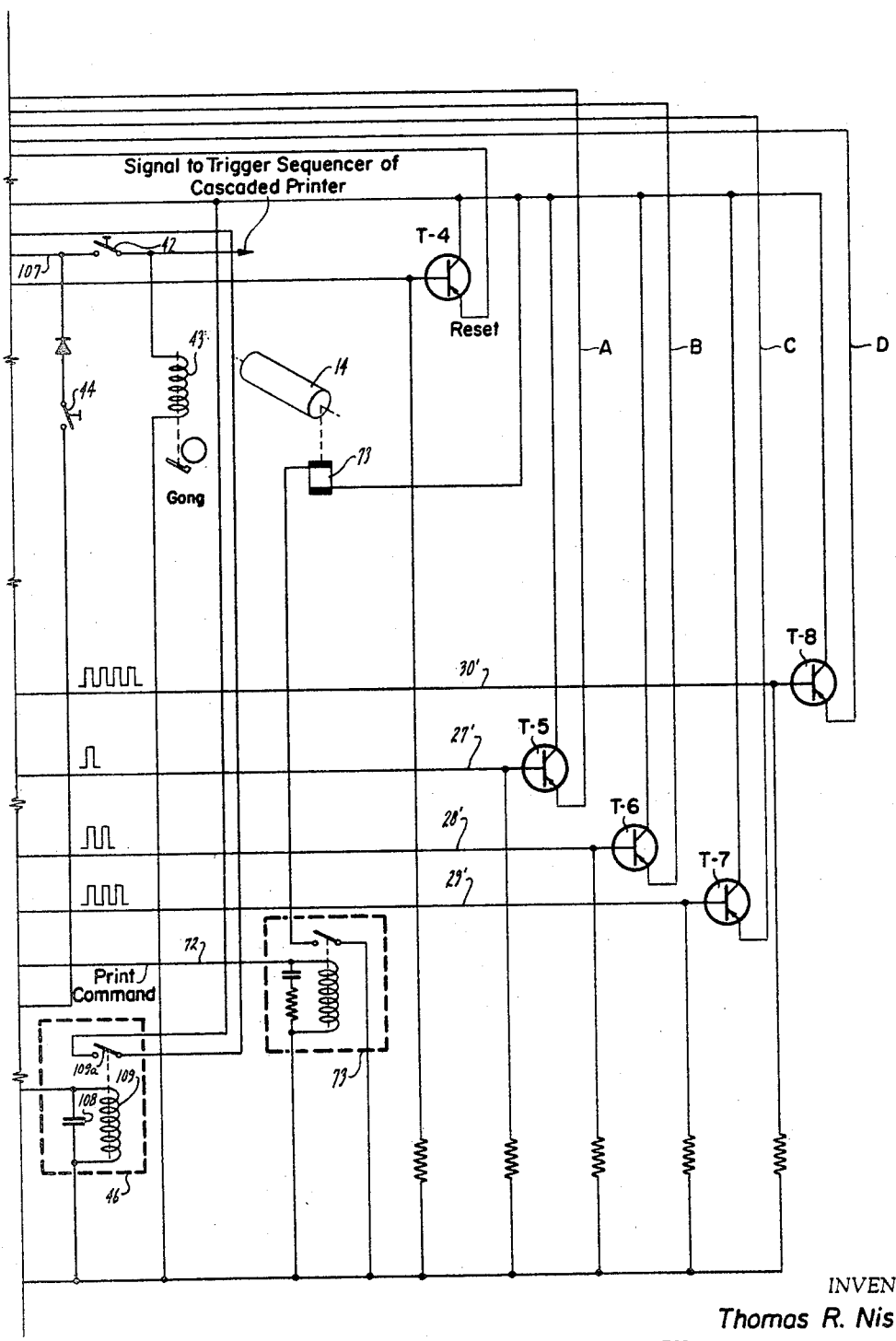

For example, in FIGURE 2 the printing element companies a printing wheel 12 carrying a predetermined ordered sequence of characters, such as the raised type faces 13, each of which is adapted to be brought into printing position with respect to a printing platen 14. Platen 14 and pressure sensitive paper 16 are arranged to cooperate with the printing elements 12 for recording the condition thereof after they have been positioned by the students' responses. The platen is operatively responsive to a print signal so as to be driven against all printing elements simultaneously. On the return movement of the platen the paper 16 will be advanced one increment of displacement. Each printing element 12 is stepped cyclically by means of a coil 17 to a predetermined point in the rotation of the printing element 12 whereupon further stepping of element 12 is arrested by the opening of a pair of contact points 18 in circuit with the coil 17 and operated by a cam surface 19 formed on the inner wall of a flange 21 of element 12.

Each printing unit 11 preferably also includes a viewing window 22 whereby the printing condition of each print unit can be visually inspected. Accordingly, a font of printed characters is carried on the side of element 12 to register with window 22 and show that one of the characters 12 which is in printing position with respect to platen 14. (It is to be understood that the raised characters 13 and printed font applied to the side of the elements 12 will not necessarily be arranged in adjacent relationship.)

In the foregoing manner a plurality of printing elements is provided, each of which is steppable through a predetermined ordered sequence of characters to be printed in response to receipt of a related ordered sequence of pulses.

A plurality of student stations 23 have been provided, each of which includes means to operatively transmit pulses to its associated printing unit from a selected one of a plurality of signal transmission channels representing the possible answers which can be entered by the student. Thus, as schematically represented in FIGURE 1, each student station 23 includes a wiper arm 24 adapted to be variously positioned to one of four positions representing answers A, B, C, D. Each wiper arm 24 is connected to a line 26 which operates the printing units 11. Each wiper 24, depending upon the positioning thereof, will transmit a different signal comprised of different numbers of pulses, such as 1, 2, 3, or 4 pulses, to its associated printing unit 11.

A pulse transmission channel for each of a predetermined number of possible answers to be manifested by the students operating stations 24 includes the four interrogation lines 27, 28, 29, 30. Means for applying the different signals to each of the interrogation lines 27 through 30 (so as to cause those printing units 11 which are coupled to the various lines 27–30 to be conditioned for recording a character related to the signal applied) includes a sequencer and means for driving and pulsing the sequencer through a cyclically arranged series of contact points.

The sequencer 31 is characterized by cyclic moving armature 32 and means 33 to drive and pulse the armature at each of a number of cyclically arranged contact points 34. Armature 32 is arranged to transmit a pulse to each of the contact points 34 and thereafter to be advanced to the next succeeding contact point during a period of time when no pulse is present upon the armature. Thus, by employing a stepping solenoid of the type where relay points are closed during energizing of the solenoid and by arranging the armature to step only during the spring-urged return stroke of the solenoid armature, the cyclic moving armature 32 will move only during those periods when it is not conducting. As will be further explained below, the sequencer drive means and pulser 33 are preferably comprised of a buzzer arrangement using discharge through the relay contacts and the charging time of a condenser to provide stepwise movement of armature 32.

Sequencer 31 includes means to arrest its movement at the end of each cycle of operation as shown for example schematically in FIGURE 1 by means of the off-normal contact point 36 schematically operated by the cam surface shown on armature 32. A triggering line 37 further schematically represents the capability of applying a pulse to armature 32 when it is in its home position. The dashed line 38 represents mechanical output of drive means 33 whereby armature 32 is moved incrementally and line 39 normally serves to supply the pulses to armature 32 at each contact point position.

If desired, at the start of each cycle of operation a gong can be sounded followed by a short delay period allowing students to at least take a quick guess at a proper answer. Accordingly, connected to the home contact point a line 41 leads through a switch 42 which, when set serves to ring a gong 43. Also a switch 44 is provided which, when set serves to apply a short delay inhibiting the buzzing action of sequencer drive means 33 whereby the mechanical output 38 thereof will be delayed accordingly. By means of the delay 46 the subsequent application of a pulse to line 39 is delayed by a commensurate period and, as will be further explained below this, in general, is accomplished by suppressing the functioning of a condenser within drive means 33.

Each of the interrogation lines 27, 28, 29 and 30 is provided with that number of contact points equal to the number of pulses which it is desired to apply thereto. Accordingly, from the foregoing it will be readily apparent that as the cyclic moving armature 32 arrives at contact points associated with lines 27–30 1, 2, 3, and 4 pulses will be respectively applied to the four lines coupling each student station to lines 27–30. The number of pulses, however, which will be transmitted to the printing unit 11 associated with any particular student station will be determined by the setting of wiper 24 thereof.

Inasmuch as the pulses to armature 32 (with the exception of a triggering pulse applied by the schematically represented line 37) will normally be applied thereto via line 39, at the end of each cycle of operation an off-normal contact point 36 will be opened so as to interrupt further advance of armature 32.

Means are provided to reset each printing unit during an initial portion of each cycle of operation so that the last previous answer of each student will remain for viewing via windows 22 of each print unit 11 thereby permitting the teacher to discuss the preceding question while viewing the responses entered by students in the class.

As was previously noted each printing element is cyclically driven until a cam 19 serves to open contact points 18 thereby preventing further advance of the printing element. Normally contact points 18 will open at that position of element 12 whereby element 12 is reset to an initial starting position. Means for resetting each element 12 therefore have been provided in the form of a number of contact points equal to or exceeding the number of positions of print element 12. The reset contact points are arranged in a bank 47 coupled to a reset line 48 whereby a series of reset pulses will be fed to each print unit 11 until the reset position of each is reached. It will be readily apparent that with different answers recorded in the various print units 11 the reset position will be reached at different times, yet all will be reset to the same initial starting position for each question.

Printing unit designated 11a can be selected by means of switch 49 to constitute an instructor's printing unit for purposes of recording the proper answer for each question in spacial relation to the recorded responses of each student of the class. Operation of the instructor's printing unit 11a is effected through a correct answer storage means 51 settable to that number of stable states corresponding to the number of possible answers for a given question.

Storage means 51 is arranged whereby each stable state thereof serves to operatively couple a related one of the channels represented by interrogation lines 27–30 to transmit pulses to the instructor's printing unit 11a. In addition of the four stable states represented by the input lines 52, 53, 54, 55 an additional stable state of storage 51, when effected, serves to apply an arbitrary printed character to the paper 16 which can, for example, take the form of an asterisk or a number or character beyond the range of numbers or characters which can be recorded by any student station 23. Thus, the fifth position of wiper 56 designated by the character "x" serves to combine the pulses applied on two of lines 52–55 so as to advance printing element 12 to a character beyond the range of movement which can be accomplished by any student station 23. Accordingly, the jumper line 57 serves to sum the pulses on a plurality of the transmission channels to obtain a composite signal therefrom which is fed to the instructor's printing unit. Thus, for any one of a number of reasons whenever an instructor might desire to present a question of this own choosing different from programmed questions he can conveniently identify which question would be the subject of a deviation in the program merely by selecting the fifth stable condition of storage means 51.

Instructor's station 58 not only includes the correct answer storage 51, as schematically shown but also includes means for starting the cycle of operation which, while being initiated in any one of several ways, in general requires application of a start pulse upon line 59 leading to sequencer drive means and pulser 33.

A print control switch 61, when depressed, serves to apply a single pulse from power supply 62 to be fed to line 59 and thereby initiate a triggering pulse to the armature 32. The instructor can designate a proper answer to any given question by means of a manual selector 63 which serves to couple the four answer lines designated A, B, C, D, and the special question identification position labelled with the letter "x." By manually establishing his selection of the appropriate answer to the question (or by designating one question as a deviation from the program) a pulse will be applied via line 59 to sequencer drive means and pulser 33. Thus, the conditioning of selector 63 is fed through an instructor's answer selection relay panel 64. A corresponding setting of the instructor's correct answer storage 51 is obtained by means of the relay panel 64 as indicated by the mechanical connection designated 66.

A cycle of operation can also be commenced by means of a program controlled correct answer pulse appearing on any one of the lines 67, 68, 69, 70 as for example may be read from a pre-recorded program. Thus, a pulse appearing on lines 67–70 serves to operate relay panel 64 and to provide a related setting of storage 51 all as indicated by the mechanical connection 71.

Operation of the system in general is as follows:

A triggering pulse is supplied to sequencer drive means and pulser 33 via line 59, either from the print switch 61, a manual positioning of selector 63, or the correct answer input via lines 67–70 in the form of a pulse appearing on one of the four last named lines. Manual selection of a correct answer by the instructor or receipt of a pre-recorded correct answer pulse serves to store the correct answer in the instructor's storage 51. A triggering pulse is applied, as indicated by the schematic line 37 to a cyclic movable armature 32. The triggering pulse is then, if desired, fed to sound a gong 43 via pre-closure of switch 42. Instead of a gong, the triggering line 59 of another similar printer can be substituted, so that printers can be cascaded, with the operation of the first unit causing each other printer in the chain to operate. The application of a triggering pulse to armature 32 also is fed, if desired, by closure of switch 44 back to sequencer drive means 33 in a manner introducing initial delay which serves to postpone the application of a pulse to the next successive contact point 34. Armature 32, however, will be advanced to the next successive contact point at the end of the triggering pulse which was applied to it.

After the pre-delay, if any, successive pulses will be applied via line 39 to armature 32 at each succeeding contact point 34. The first bank of contact points 34 represented by bank 47 serves to apply a series of reset pulses to line 48 whereby each print unit 11 is advanced to that point in the cycle thereof whereby cam 19 opens the associated driving relay 17 operating same. Subsequently, as armature 32 arrives at each of interrogation lines 27–30, one or more pulses will be applied thereto.

It is assumed that prior to the commencement of each cycle of operation of the sequencer 31 all students will have set their student stations 23 in a condition whereby one of the four input lines thereto will be coupled to its associated printing unit 11. Thus, when armature 32 arrives to apply pulses to lines 27–30 one or more pulses will be fed, depending upon the condition of the individual student stations, to the associated printing unit 11. As a result, relay 17 of each printing unit will step the printing element 12 thereof a related number of steps and dispose the printing element for printing out one of the four possible answers.

After the last pulse has been applied to line 30 armature 32 applies a print command pulse to line 72 to operate a print solenoid 73 whereby platen 14 is urged momentarily against the raised characters of each printing element 12. During the return movement of platen 14 the platen will rotate one increment of displacement by means such as a ratchet (not shown). At the ends of platen 14 a sprocket wheel having teeth 74 serves to engage holes formed along the edge of the sheet of paper 16 and thereby advances same one increment of displacement thereof.

Up to this point a period of time on the order of one second may have been consumed and therefore in order to provide additional delay after the printing of each question there is included a post delay means whereby a selected degree of additional delay as determined by selection of switches 77, 78 can be introduced into each cycle of operation. The advantage derived from the use of the post-delay is typically that an automated program may contain control signals that last longer than the print-cycle, and since it would be confusing to have more than one print per question, it is advantageous to be able to introduce a selected degree of delay after the print-cycle is complete, but before the equipment is restored to a condition where it will accept a new print command.

A system based on the foregoing description and operation has been constructed and operated satisfactorily as shown in FIGURES 3A–3D. Detailed operation of the particular system can now be described, having in mind the foregoing description. Like or comparable elements, components or units of the detailed system shown in FIGURES 3A–D to elements, components or units previously described, utilize the same reference numerals. In addition, certain sections of the detailed schematic wiring diagram have been outlined to correspond to units shown and described with respect to FIGURE 1.

Detailed operation of the system therefore proceeds as follows:

Student stations 23 are arranged whereby any one of four answers can be entered, which answers are designated A, B, C, D respectively, each of which can be coupled to receive pulses from the respective pulse transmission channels 27, 28, 29 and 30. By way of example, a student station No. 3 has been shown and its output line 81 is coupled to feed pulses to the coil 17 of an associated printing unit 11.

Assuming that student No. 3, for example, has selected B as his answer, and assuming further that the instructor desires to record the proper answer, the instructor will operate switch 49 whereby the first print unit 11a will receive pulses applied by the instructor in accordance with the selection of answers made by the instructor. For example, if, to the first question, C is the correct answer then push button 63 for C will be momentarily depressed by the instructor. By depressing the push button at the instructor's manual panel 82 a pulse will be applied from the power supply 62 via line 83, line 84, and 86. Line 87 feeds the pulse to a relay 88 which, when it is pulled in serves to close a holding point 88a. The pulse which serves to energize relay 88 also travels via line 69 through the diode isolation 91 and onto the triggering line 59. It will be apparent, from the foregoing, that a triggering pulse will appear on line 59 by the manual depression of the print switch 61 located at the instructor's manual panel 82 just as a triggering signal will appear on line 59 by virtue of pre-recorded program control pulses applied to any one of the four lines 67, 68, 69, 70.

When a print cycle is started by depressing the print switch 61 it will be evident that there will be no correct answer printed for the instructor's print unit 11 and accordingly, the system can record answers of students with or without a print out of the correct answer.

Once a pulse appears on trigger line 59 it will start the sequencer drive means and pulser 33 whereby a full cycle of operation will be effected. The pulse on line 59 travels through the contact points of the switch 92 held closed whenever armature 32 is in its home position. Thus, armature 32 can comprise a rotary stepping switch utilizing three wipers 32a, 32b, 32c each of which is arranged 120° from the other and all of which move as a unit through 360°. At the home position whereby wiper 32a rests upon the home contact point, an off-normal cam 93 serves to close the contact points of switch 92. Thus, the trigger pulse from line 59 is coupled at such time to the input line 94 leading to the base electrode of a transistor T1. Application of the large minus voltage to the base electrode of transistor T1 serves to drive it into conduction and at the same time serves to place transistor T2 into conduction. The output of transistor T2 is further amplified by transistor T3 to draw a current through the coil 96 from power supply 62 via line 83 and diode 97 so long as transistor T3 is biased into conduction. This period is determined by the time constant of condenser 98 as now to be described.

It will be observed that the supply voltage of −28 volts from line 83 via diode 97 and resistor 95 is applied to one side of condenser 98, and the other side of the supply voltage (ground) is connected via resistors 99 to the other side of condenser 98. Condenser 98 would proceed to charge up, but for the inhibiting discharge circuit consisting of either the resistor 104, line 102, and contact 96a or, if the stepper is in its home position, resistor 104, line 114, diode 115 and off-normal contact 112. If it is assumed that no pre-delay has been applied by means of switch 44, then, once the stepper has been moved away from its home position by the conduction of transistor T1, the condenser 98 will proceed to charge up. At a certain point in the rise thereof, transistor T2 will begin to conduct, and it in turn causes transistor T3 to conduct, energizing the coil 96 and closing the contact 96a, thereby completing the inhibiting discharge circuit referred to above and causing transistors T2 and T3 to turn off and the circuit to be restored for a repetition of the action.

As mentioned above, when current ceases to flow in coil 96 its armature will be released and urged for example, upwardly as shown by arrow 106 causing the stepping switch to be advanced to the next subsequent contact point by mechanical action represented by the dashed line 38.

In those instances where a pre-delay and a gong are to be utilized, switches 42 and 44 are closed whereby a pulse is applied via wiper 32a by means of the contact point 96b upon the energization of coil 96. The applied pulse travels a path from the power supply 62, line 83, contact point 96b, home position contact point 34, line 107, switch 42, gong 43 and then to ground. The same pulse traveling via line 107 also passes through a diode and switch 44, now closed, to a pre-delay circuit 46 and then to ground.

Pre-delay circuit 46 includes a condenser 108, coil 109 and relay point 109a. Due to the discharge of condenser 108, coil 109 will hold its point 109a closed for a period dependent upon the time constant of condenser 108, and thereby keep condenser 98 at substantially supply potential. Ultimately, however, the potential across (and current through) coil 109 will diminish to a point whereby relay point 109a will again open so as to permit condenser 98 to commence the buzzing action.

Subsequently, under control of condenser 98 armature 32 will apply a pulse to each of the contact points. The first ten contact points after the home contact point 34 which are pulsed by wiper 32a are fed on line 48 to be amplified through a power transistor T4 and then through line 48' to pass through the normally closed switch 18 of each print unit 11 and thereby energize the coils 17 thereof repeatedly until the cam surface 19 opens switches 18 to condition each print element 12 at its reset position. After passing through the reset bank 47 of contact points of the stepping switch 32, a second wiper 32b will be in position to commence applying pulses to the various contact points which include the points connected to apply different numbers of pulses to the pulse transmission channels 27, 28, 29, 30, all designated with a prime mark (′) in FIGURE 3d, inasmuch as pulses appearing thereon are subsequently boosted by power transistors T5–T8.

In this manner very low current can be used at the off-normal contact points and thereby minimize the wear and frequency of replacement which would otherwise be required. Subsequently, a pulse is applied upon the print command line 72 via the print solenoid and driver circuits 73 so as to print out the condition of each print element 12.

At this point in the cycle assuming the maximum post delay is desired, switches 77, 78 are both closed whereby a pulse applied to each of the contact points associated therewith will impart something on the order of a two second suppression of the function of condenser 98 in the same manner as was previously described with respect to circuit 46. After wiper 32c leaves the last contact point the off-normal cam 93 will serve to inhibit further operation of sequencer drive means and pulser 33 by effectively shorting out condenser 98. This is achieved, through a circuit traced from resistor 95, diode 97, lines 83, 111, off-normal contact point 112, line 113, diode 115, line 114, line 116, diode 117 and resistor 104.

In those instances where the instructor desires to record his own, presumably proper, answer it is to be noted that the closure of push buttons 63 serves to energize a relay such as relay 88, previously described. As relay 88 became energized a holding point 88a was pulled in along with a storage point 88b. Storage point 88b forms a completed circuit whereby pulses appearing upon the pulse transmission channels 27–30 will be transmitted via line 118 to switch 49 and subsequently to actuate the printing unit 11 associated with the instructor.

By using sluggish relays the relay point 88a will be closed and stay closed even after the pulse which energized coil 88 has disappeared. This is required in the present design since the stepper coil 96 can only advance wiper 32 and off normal contact cam 93 during its de-energized phase. Rotational movement of cam 93 serves to close a holding circuit via contact point 119 and line 121, and 122 whereby coil 88 remains energized to hold in storage the selection of the instructor.

From the foregoing it will be readily evident that there has been provided an improved answer entry and recording system whereby students' answers are recorded whether correct or not and, if desired, appear in spacial relation to the recorded proper answer introduced either by an automatic pre-recorded program or manually by an instructor. Where answer selection at student stations 34 is by a plurality of push buttons as shown, for example, with respect to the instructor's station it will be readily apparent that only one answer can be entered notwithstanding the fact that a student may wish to depress more than one button at a given time. Thus, should a student station employ such push buttons, depression of two push buttons at the same time will merely serve to sum the number of pulses which will be fed to his associated printing unit 11 whereby a single print out will occur. Where the number of pulses exceeds the number of possible answer positions of the print element 12 it will be at once apparent that a spurious print out will occur. Therefore, the student cannot "beat" the machine by depressing more than one button.

It is also to be noted that where a professor desires to deviate from the prepared program he can ask a question of his own, and identify this question by depressing his push button 63 associated with the "x" position.

From the foregoing it is to be understood that the ordered sequence of characters 13 to be printed may constitute instead of letters A, B, C, D, etc., a sequence of numbers 1, 2, 3, 4, 5, etc., representing the various answers to be made by the students. It will be further apparent that by adding extra contact points 34 for the interrogation lines which are shown, as many pulses as desired can be fed to the various printing units. The combination of pulses on each interrogation line, therefore, comprise a character selection signal appearing thereon. The character selection signals are different for each of the interrogation lines forming part of the signal transmission channel to the various printing units.

Where the first character 13 of the ordered sequence upon printing element 12 is, for example, a zero, then those printing units wherein the wiper is positioned to the "off" position will print out a zero so that the instructor can be advised that no answer was entered from such stations.

I claim:

1. An answer entry and recording system comprising a plurality of printing units, each unit including a printing element bearing a predetermined ordered sequence of different characters to be printed, and having means for stepping the printing element through said ordered sequence in response to receipt of a related ordered sequence of pulses to dispose said element in condition for printing one of said characters, a pulse transmission channel for each of a predetermined number of possible answers to be made by students, a student station associated with each of said printing units, means at each student station to selectively couple any one of said channels to transmit pulses to the associated printing unit for said station so as to manifest a response of the student, means for applying different numbers of pulses correspondng to the selectable student answers to each of said channels to cause those printing elements coupled thereto to be conditioned to print a related character, the last named means thereafter providing a print signal, and means cooperating with said print elements and operatively responsive to said print signal from the last named means to record the selected answers of the students.

2. Apparatus according to claim 1 wherein each of said printing elements moves cyclically through said ordered sequence of characters, and means associated with each of said units serving to arrest movement of said elements individually at a predetermined point in the cycle thereof, and means for applying a sufficient number of pulses to all of said units after recording the respective conditions thereof and before start of a subsequent operation to advance all said elements to said point in the cycle of each to reset same to said point.

3. An answer entry and recording system comprising a plurality of printing units, each unit having an element bearing thereon a predetermined ordered sequence of different characters and steppable through said sequence in response to receipt of signals related to the characters of the ordered sequence to condition the element for printing one of the characters thereof, a signal transmission channel for each of a predetermined number of possible answers to be manifested by students for a given question, a student station associated with each of said printing units, means at each student station to selectively couple its associated printing unit to receive signals from a selected one of said channels to manifest a response of the student, means for applying different signals to each of said channels to cause those printing units coupled thereto via said stations to present a character thereon for recording in accordance with the signal applied, and means cooperating with the print units for printing the characters presented by all said printing units.

4. An answer entry and recording system comprising a plurality of student printing units bearing different characters thereon, with each having an element steppable through a predetermined ordered sequence of said characters in response to receipt of signals related to the characters of the ordered sequence to condition the element for printing one of the characters thereof, a pulse transmission channel for each of a predetermined number of possible answers to be manifested by students for a given question, a student station associated with each of said printing units, means at each student station to selectively couple its associated printing unit to receive signals from a selected one of said channels to manifest the response of the student, an instructor's printing unit having characters thereon corresponding to the characters on said student printing units, the last named printing unit having an element steppable through a predetermined ordered sequence of the characters thereon in response to receipt of signals related to the characters of the ordered sequence to condition the element for printing one of the characters thereof, and an instructor's correct answer storage means settable to a plurality of stable states, the number of stable states being related at least to the number of possible answers for a given question, said stable states serving to cause said storage means to operatively couple related ones of said channels to said instructor's printing unit, means responsive to setting said storage to any of the stable states thereof to apply different signals to each of said channels to cause those of all said printing units coupled thereto to be conditioned for recording respective characters related to the signal applied, and means cooperating with the print units for recording the condition thereof.

5. Apparatus according to claim 4 further including means for receiving prerecorded pulses designating the correct answer to a question and for setting said storage to a related one of the stable states thereof to store the correct answer.

6. An answer entry and recording system comprising a plurality of student printing units bearing different characters thereon, each unit having means for presenting one of said characters for printing in response to receipt of character selection signals related to each character to be printed, a signal transmission channel for each of a predetermined number of possible answers to be manifested by students for a given question, a student station associated with each of said printing units, means at each student station to selectively couple its associated printing unit to receive said character selection signals from a selected one of said channels to manifest the response of the student, an instructor's printing unit having a sequence of different characters thereon corresponding to the characters on said student printing units and having means for presenting one of said characters thereon for printing in response to receipt of character selection signals related to each character to be printed, and an instructor's correct answer storage means settable to a plurality of stable states, said stable states serving to cause said storage mean to operatively couple related ones of said channels to said instructor's printing unit, and means responsive to setting said storage to said stable states to apply different signals to each of said channels to cause said printing units coupled thereto to be conditioned for recording a character related to the signal applied.

7. Apparatus according to claim 6 wherein said storage means further includes means for forming a composite signal from signals taken from a plurality of said channels and for conditioning said instructor's printing unit in response thereto to print a character different from characters printed under control of said student stations.

8. Apparatus according to claim 6 wherein said storage means further includes means for summing signals from a plurality of said channels and for conditioning said instructor's printing unit in response thereto.

References Cited

UNITED STATES PATENTS 3,300,876   1/1967   Johannsen _____ 35—9

EUGENE R. CAPOZIO, *Primary Examiner.*

W. W. NIELSEN, *Assistant Examiner.*